(«12») United States Patent
Ogawa

(10) Patent No.: US 11,524,673 B2
(45) Date of Patent: Dec. 13, 2022

(54) HYBRID VEHICLE

(71) Applicant: TOYOTA JIDOSHA KABUSHIKI KAISHA, Toyota (JP)

(72) Inventor: Yuki Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 98 days.

(21) Appl. No.: 17/012,158

(22) Filed: Sep. 4, 2020

(65) Prior Publication Data
US 2021/0078565 A1 Mar. 18, 2021

(30) Foreign Application Priority Data

Sep. 18, 2019 (JP) .............................. JP2019-169488

(51) Int. Cl.
*B60W 20/20* (2016.01)
*B60W 20/12* (2016.01)
*B60W 20/11* (2016.01)
*B60W 20/13* (2016.01)
*B60W 50/08* (2020.01)

(52) U.S. Cl.
CPC ............ *B60W 20/12* (2016.01); *B60W 20/11* (2016.01); *B60W 20/13* (2016.01); *B60W 50/08* (2013.01); *B60W 2510/244* (2013.01); *B60W 2510/246* (2013.01)

(58) Field of Classification Search
CPC ...... B60W 20/12; B60W 20/11; B60W 20/13; B60W 2510/244; B60W 2510/246; B60W 20/15; B60W 10/08; B60W 2710/244; B60W 50/082; B60W 2530/18; B60K 2370/16; B60K 2370/166

USPC ............. 701/22; 903/903; 180/65.265, 65.29
See application file for complete search history.

(56) References Cited

U.S. PATENT DOCUMENTS

| 10,328,930 B2 | 6/2019 | Abe et al. |
| 10,899,338 B2* | 1/2021 | Lee .......................... B60L 58/12 |
| 2007/0112475 A1* | 5/2007 | Koehler ............. G01C 21/3617 |
| | | 701/1 |
| 2011/0246004 A1* | 10/2011 | Mineta ................... B60W 20/11 |
| | | 903/903 |

(Continued)

FOREIGN PATENT DOCUMENTS

| JP | 2010-47152 A | 3/2010 |
| JP | 2014-151760 A | 8/2014 |
| JP | 2016-097697 A | 5/2016 |

*Primary Examiner* — Dalena Tran
(74) *Attorney, Agent, or Firm* — Sughrue Mion, PLLC

(57) ABSTRACT

There is provided a hybrid vehicle that enables user to be more appropriately notified of a control effect by performing a drive support control. A hybrid vehicle includes an engine; a motor; a battery; map information; and a control device programmed to set a drive route from a current location to a destination, to create a drive support plan that assigns one of drive modes including a CD mode and a CS mode to each of drive sections of the drive route, and to perform drive support control that causes the hybrid vehicle to be driven along the drive support plan. The control device accumulates control effect obtained by performing the drive support control and notifies the control effect when the hybrid vehicle reaches the destination. The control device deletes the control effect when the predetermined deletion condition is satisfied.

9 Claims, 3 Drawing Sheets

(56) References Cited

U.S. PATENT DOCUMENTS

2016/0137184 A1 5/2016 Hokoi et al.
2020/0124431 A1* 4/2020 Heap .................. G01C 21/3469

* cited by examiner

HYBRID VEHICLE

CROSS-REFERENCE TO RELATED APPLICATIONS

The present disclosure claims priority to Japanese Patent Application No. 2019-169488 filed Sep. 18, 2019, which is incorporated herein by reference in its entirety including specification, drawings and claims.

TECHNICAL FIELD

The present disclosure relates to a hybrid vehicle for managing an application of a plurality of drive modes.

BACKGROUND

A conventionally known hybrid vehicle of this type performs a drive support control for driving the hybrid vehicle along with a drive support plan in each of drive sections of a drive route from a current location to a destination (as described in, for example, JP2014-151760A). The drive support plan is created by assigning one of a motor drive (EV drive) mode in which an engine is stopped and the hybrid vehicle is driven with a power from a motor, and a hybrid drive (HV drive) mode in which the hybrid vehicle is driven with a power from an engine and a power from a motor during operation of the engine. The drive support plan is created to assign the motor drive mode and the hybrid drive mode such that a state of charge SOC (SOC: State of Charge) that is a ratio of remaining capacity of a battery becomes equal to a value 0 when the hybrid vehicle reaches the destination.

SUMMARY

In the hybrid vehicle, when the drive support control is performed, it is preferable to notify a user of an effect (control effect) of performing the drive support control. The control effect may include, for example, an accumulated distance of the motor drive or an accumulated distance of the hybrid drive in the drive support control. The control effect described above is basically notified when the drive support control is terminated and then the data regarding the control effect is deleted after the data is notified. It is unclear, however, what kind of condition is used to delete the data except for the termination of the drive support control. For example, when the drive support control is interrupted to reset the control effect upon system stop of the hybrid vehicle for a temporary break, the user cannot be notified of an appropriate control effect when the route guidance is restarted and the hybrid vehicle reaches the destination upon system activation after the break.

The hybrid vehicle of the present disclosure mainly aims to enable the user to be more appropriately notified of the control effect by performing the drive support control.

In order to achieve the above primary object, the hybrid vehicle of the present disclosure employs the following configuration.

The present disclosure is directed to a hybrid vehicle. The hybrid vehicle includes an engine, a motor, a battery, map information, and a control device programmed to set a drive route from a current location to a destination, to create a drive support plan that assigns one of drive modes including a CD mode and a CS mode to each of drive sections of the drive route, and to perform drive support control that causes the hybrid vehicle to be driven along the drive support plan.

The control device includes a device configured to accumulate control effect obtained by performing the drive support control, to notify the control effect when the hybrid vehicle reaches the destination by the drive support control, and to hold the control effect even when the drive support control is stopped when a predetermined holding condition is satisfied.

In the hybrid vehicle of the present disclosure, the control device accumulates the control effect obtained by performing the drive support control and notifies the control effect when the hybrid vehicle reaches the destination by the drive support control. The control device holds the control effect even when the drive support control is stopped when the predetermined holding condition is satisfied. This enables the user to be more appropriately notified of the control effect by performing the drive support control.

DESCRIPTION OF EMBODIMENTS

Figure 1:
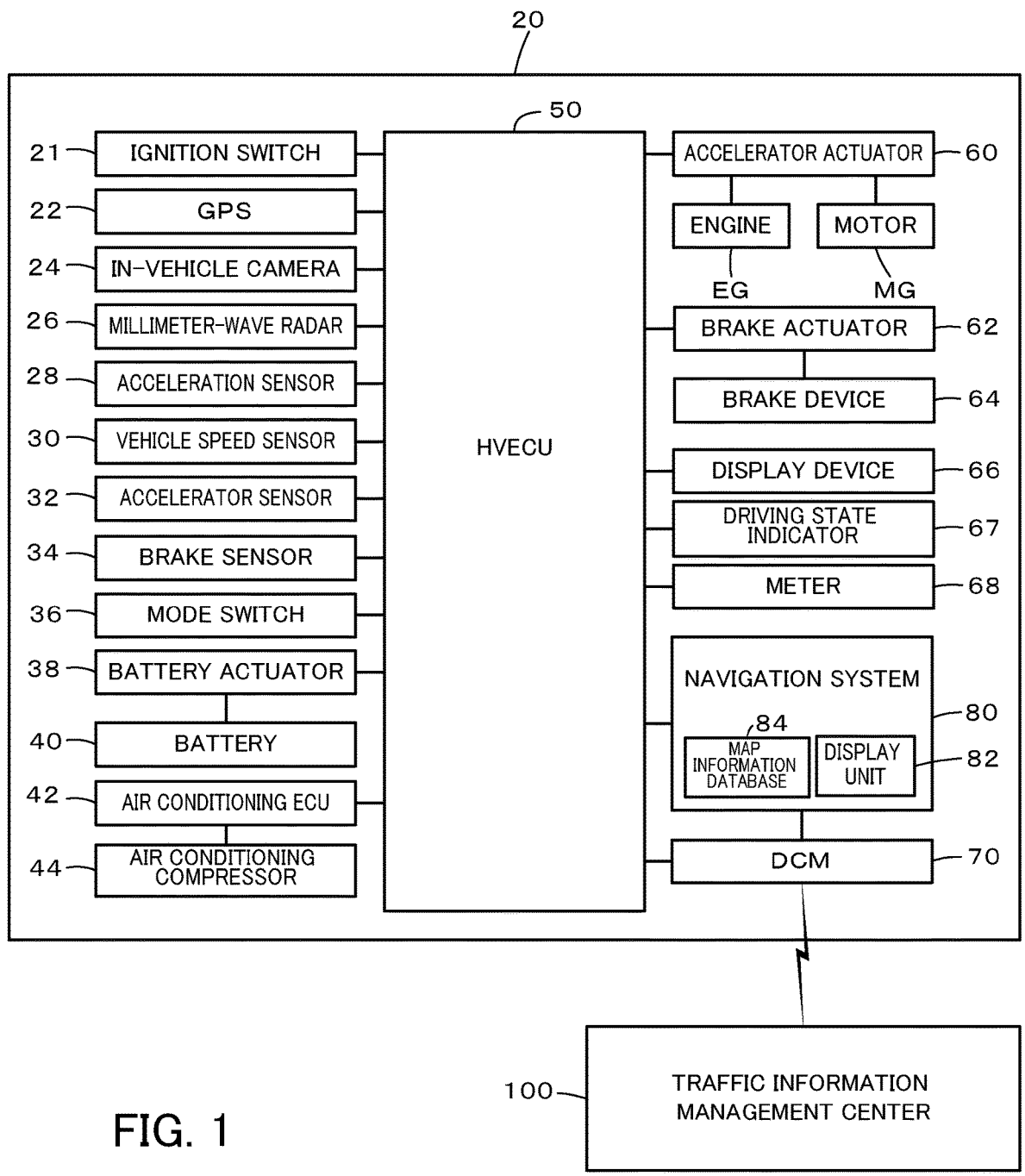
FIG. 1 is a block diagram illustrating an example of a configuration of a hybrid vehicle focusing on a hybrid electronic control unit according to an embodiment of the present disclosure.

FIG. 1 is a block diagram illustrating an example of a configuration of a hybrid vehicle 20 focusing on a hybrid electronic control unit (hereinafter referred as "HVECU") 50 according to the embodiment of the present disclosure. The hybrid vehicle 20 of the embodiment includes an engine EG and a motor MG as a power source. The hybrid vehicle 20 of the embodiment is driven by switching between a CD mode (Charge Depleting mode) and a CS mode (Charge Sustaining mode). In the CD mode, the motor drive is prioritized to reduce the state of charge SOC of a battery 40. In the CS mode, the motor drive and the hybrid drive are combined to maintain the state of charge SOC of the battery 40 at a target ratio. In the motor drive, the hybrid vehicle 20 is driven only by the power from the motor MG while the engine EG is stopped. In the hybrid drive, the hybrid vehicle 20 is driven by the power from the engine EG and the motor MG during operation of the engine 20.

The hybrid vehicle 20 of the embodiment includes an ignition switch 21, a GPS (Global Positioning System, Global Positioning Satellite) 22, an in-vehicle camera 24, a millimeter-wave radar 26, an acceleration sensor 28, a vehicle speed sensor 30, an accelerator sensor 32, a brake sensor 34, a mode switch 36, a battery actuator 38, the battery 40, an air conditioning electronic control unit (hereinafter referred to as an air conditioning ECU) 42, an air conditioning compressor 44, the HVECU 50, an accelerator actuator 60, a brake actuator 62, a brake device 64, a display device 66, a driving state indicator 67, a meter 68, a DCM (Data Communication Module) 70, and a navigation system 80 in addition to the power source.

The GPS 22 is a device for detecting a position of a vehicle based on signals transmitted from a plurality of GPS satellites. The in-vehicle camera 24 is a camera that captures an image of the surroundings of the vehicle, and corresponds to, for example, a front camera that captures an image of the front of the vehicle, a rear camera that captures an image of the rear of the vehicle, and the like. The millimeter-wave radar 26 detects a distance and a relative speed between the own vehicle and a vehicle ahead. The millimeter-wave radar 26 also detects a distance and a relative speed between the own vehicle and a vehicle behind.

The acceleration sensor 28 is, for example, a sensor for detecting acceleration in the longitudinal direction of the vehicle and detecting acceleration in the lateral direction of the vehicle. The vehicle speed sensor 30 detects vehicle speed based on wheel speed or the like. The accelerator sensor 32 detects accelerator position or the like according to a depression amount of an accelerator pedal by the driver. The brake sensor 34 detects a brake position or the like as a depression amount of a brake pedal by the driver. The mode switch 36 switches between the CD mode and the CS mode, and is arranged in the vicinity of a steering wheel of the driver's seat.

The battery actuator 38 detects various states of the battery 40, for example, a voltage between terminals, a charge/discharge current, and a battery temperature. The battery actuator 38 is configured to control the battery 40 based on a detected value. The battery actuator 38 calculates the state of charge SOC as a ratio of the remaining capacity of electric power dischargeable from the battery to the overall capacity of the battery based on the charge/discharge current. The battery actuator 38 also calculates an allowable maximum output power (output limit Wout) as to be output from the battery 40 and an allowable maximum input power (input limit Win) as to be input into the battery 40 based on the calculated state of charge SOC, the battery temperature, and the like. The battery 40 is configured as a chargeable and dischargeable secondary battery, and for example, a lithium ion battery, a nickel metal hydride battery, or a lead storage battery may be used.

The air conditioning ECU 42 is configured as a CPU-based microprocessor (CPU: not shown). The air conditioning ECU 42 also includes, for example, a ROM, a RAM, a flash memory, input/output ports, and a communication port. The air conditioning ECU 42 is incorporated in an air conditioning system configured to condition air in the passenger compartment. The air conditioning ECU 42 drives and controls the air conditioning compressor 44 in the air conditioning system such that the temperature of the passenger compartment becomes the set temperature.

The engine EG is configured, for example, as an internal combustion engine. The motor MG is configured, for example, as an electric motor that also functions as a generator such as a synchronous motor. The motor MG is connected to the battery 40 via an inverter (not shown), and outputs driving force by using electric power supplied from the battery 40 or charges the battery 40 with the generated electric power.

The HVECU 50 is configured as a CPU-based microprocessor (CPU: not shown). The HVECU 50 also includes, for example, a ROM, a RAM, a flash memory, input/output ports, and a communication port. The HVECU 50 sets a drive mode. The HVECU 50 also sets a target drive point (target rotation speed or target torque) of the engine EG and a torque command of the motor MG based on the set drive mode, the accelerator position from the accelerator sensor 32, the brake position from the brake sensor 34, and the input/output limit from the battery actuator 38.

The HVECU 50 performs the following processing when the hybrid vehicle is driven in the motor drive. The HVECU 50 sets a required driving force and a required power based on the accelerator position from the accelerator sensor 32 and the vehicle speed from the vehicle speed sensor 30. The HVECU 50 sets the torque command of the motor MG to output the required driving force and the required power to the vehicle. The HVECU 50 transmits the set torque command to the accelerator actuator 60. The HVECU 50 performs the following processing when the hybrid vehicle is driven in the hybrid drive. The HVECU 50 sets the target drive point of the engine EG and the torque command of the motor MG to output the required driving force and the required power to the vehicle. The HVECU 50 transmits the target drive point and the torque command to the accelerator actuator 60. The HVECU 50 performs the following processing in response to a depression of the brake pedal by the driver. The HVECU 50 sets the required braking force based on the brake position from the brake sensor 34 and the vehicle speed from the vehicle speed sensor 30. The HVECU 50 sets a regenerative torque command for regenerative control of the motor MG and a target braking force by the brake device based on the required braking force and the vehicle speed. The HVECU 50 transmits the torque command to the accelerator actuator 60 and transmits the target braking force to the brake actuator 62.

The accelerator actuator 60 drives and controls the engine EG and the motor MG in accordance with the target drive point and the torque command set by the HVECU 50. The accelerator actuator 60 performs intake air flow control, fuel injection control, ignition control, intake valve opening/closing timing control and the like to operate the engine EG at the target operation point (target rotation speed or target torque). Further, the accelerator actuator 60 performs switching control of the switching element of the inverter for driving the motor MG such that a torque corresponding to the torque command is output from the motor MG.

The brake actuator 62 controls the brake device 64 such that the target braking force set by the HVECU 50 is applied to the vehicle by the brake device 64. The brake control device is configured, for example, as a hydraulically driven friction brake.

The display device 66 is incorporated in, for example, an installation panel in front of the driver's seat. The display device 66 displays various information. The driving state indicator 67 includes an EV indicator (not shown) and an HV indicator (not shown). The driving state indicator 67 turns on the EV indicator and turns off the HV indicator during a motor drive. The driving state indicator 67 turns off the EV indicator and turns on the HV indicator during a hybrid drive. The meter 68 is incorporated in, for example, the installation panel in front of the driver's seat.

The DCM (Data Communication Module) 70 transmits information on the own vehicle to a traffic information management center 100 and receives road traffic information from the traffic information management center 100. The information on the own vehicle includes, for example, a position, a vehicle speed, a driving power and a drive mode of the own vehicle. The road traffic information includes, for example, information on current and future traffic congestion, information on current average vehicle speed and predicted value of future average vehicle speed in each of drive sections of the drive route, information on traffic regulation, information on weather conditions, information on road conditions, and map information. The DCM 70 communicates with the traffic information management center 100 at every predetermined time interval (for example, every 30 seconds, every minute, every two minutes).

The navigation system 80 is configured to guide the own vehicle to a set destination. The navigation system 80 includes a display unit 82 and a map information database 84. The navigational system 80 communicates with the traffic information management center 100 via the DCM 70. When the destination is set, the navigation system 80 sets the route based on information on the destination, information on the current location (current location of the own vehicle) received from the GPS 22, and information stored in the map information data base 84. The navigation system 80 communicates with the traffic information management center 100 at every predetermined time interval (for example, every 3 minutes or every 5 minutes) to obtain the road traffic information and performs route guidance based on the road traffic information.

When the route guidance is performed, the navigation system 80 generates a read-ahead information, such as a load information necessary for driving of each drive section, and transmits the read-ahead information to the HVECU 50 every time (or at every predetermined time interval) the road traffic information is obtained from the traffic information management center 100. The read-ahead information is generated based on, for example, information on each of drive sections of the drive route in the road traffic information obtained from the traffic information management center 100, information on driving load, the vehicle speed of the own vehicle, the driving power of the own vehicle, and the drive mode of the own vehicle. The HVECU 50 creates a drive support plan that assigns one of drive modes including the CD mode and the CS mode to each of drive sections of the drive route using the read-ahead information received from the navigation system 80 when the drive support control can be performed, and performs the drive support plan.

When update information included in the map information is obtained from the traffic information management center 100, the navigation system 80 displays an item "map update" on the display unit 82 and announces "Map information is ready to be updated. Please press the map update button." or the like. When the item "map update" is operated in response to the notification of the map update, the navigation system 80 communicates with the traffic information management center 100 via the DCM 70, obtains the map information related to the map update, and stores the map information in the map information database 84. When the map information is updated, the navigation system 80 announces "Some functions are stopped during update of map information." or the like.

The navigational system 80 counts an alive counter Cnb that increments by a value 1 at every predetermined time interval to inform the HVECU 50 or the like that the navigation system 80 is normally activated. The HVECU 50 obtains the alive counter Cnb from the navigation system 80 at every predetermined time interval and confirms that the navigation system 80 is normally activated. According to the embodiment, the navigation system 80 does not count the alive counter Cnb as a stop function during the update of the map information. The HVECU 50 counts an alive counter Chv that increments by a value 1 at every predetermined time interval to inform the navigation system 80 or the like that the navigation system is normally activated. The navigation system 80 obtains the alive counter Chv from the HVECU 50 at every predetermined time interval and confirms that the HVECU 50 is normally activated.

Figure 2:
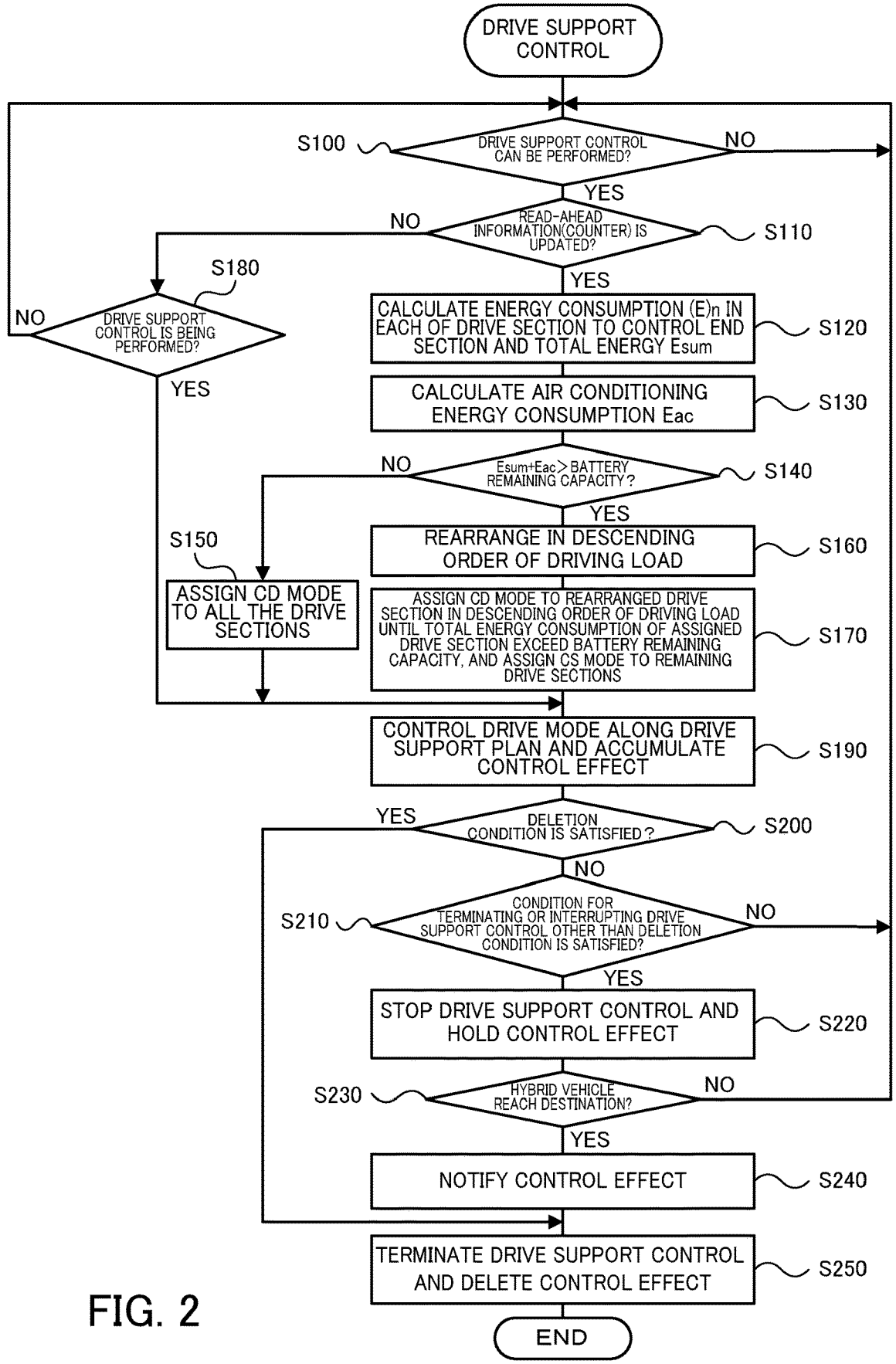
FIG. 2 is a flow chart showing one example of a drive support control performed by the hybrid electronic control unit.
Figure 3:
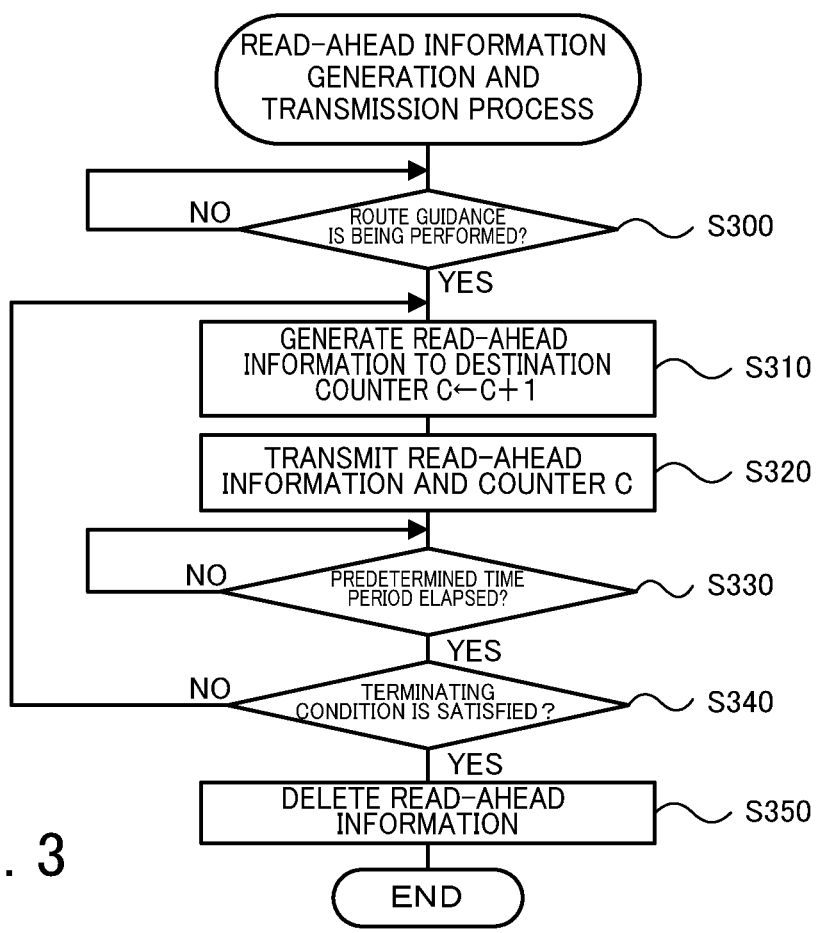
FIG. 3 is a flowchart showing one example of a read-ahead information generation and transmission process performed by a navigation system.

The following describes operations of the hybrid vehicle 20 of the embodiment, particularly, the operation when the map information is updated during the drive support control. FIG. 2 is a flow chart showing one example of a drive support control performed by the HVECU 50. This routine is performed when a destination is set, for example. FIG. 3 is a flowchart showing one example of a read-ahead information generation and transmission process performed by the navigation system 80. This routine is performed when a destination is set, for example. The following sequentially describes the drive support control, and the read-ahead information generation and transmission process.

The drive support control is described first. The HVECU 50 first determines whether the drive support control can be performed (step S100). The drive support control assigns one of drive modes including the CD mode and the CS mode to each of drive sections of the drive route and the hybrid vehicle is driven when the route from the current location to the destination is set by the navigation system 80. The HVECU 50 does not perform the drive support control when the destination is not set. The HVECU 50 does not perform the drive support control when the route guidance cannot be satisfactorily performed, for example, when there is any abnormality in the navigation system 80 or the GPS 22. Further, the HVECU 50 does not perform the drive support control when the output limit Wout that is a maximum allowable output power output from the battery 40 is small due to the low temperature of the battery 40. In this state, the engine EG may be frequently started even when the vehicle drives in the CD mode, and the vehicle cannot be driven properly in the CD mode. The HVECU 50 determines whether the drive support control can be performed at step S100 due to the circumstance described above. When it is determined at step S100 that the drive support control cannot be performed, the HVECU 50 waits until the drive support control can be performed.

When it is determined at step S100 that the drive support control can be performed, the HVECU 50 determines whether the read-ahead information transmitted and received from the navigation system 80 is updated (step S110). When it is determined that the read-ahead information is updated, the HVECU 50 calculates an energy consumption $E(n)$ in each of drive sections of the drive route from the current location to the control end section (destination), and a total energy Esum as the sum of the each energy consumption $E(n)$ (step S120). The energy consumption $E(n)$ in each of drive sections can be determined based on criteria such as whether the drive section is an urban area, a suburban area, or a mountainous area. The HVECU 50 subsequently calculates an air conditioning energy consumption Eac (step S130). In the embodiment, the air conditioning energy consumption Eac is calculated by multiplying the power consumption of the air conditioning system at that time, the predetermined power consumption, the maximum power consumption of the air conditioning system, and the like by a predetermined time period (time required for driving 10 km or 15 km).

The HVECU 50 determines whether the sum of the total energy Esum and the air conditioning energy consumption Eac is larger than the remaining capacity of the battery 40 (step S140). The remaining capacity of the battery 40 can be calculated by multiplying the total capacity of the battery 40 by the state of charge SOC. When it is determined that the sum of the total energy Esum and the air conditioning energy consumption Eac is equal to or smaller than the remaining capacity of the battery 40, the HVECU 50 assigns the CD mode to all the drive sections (step S150). When it is determined that the sum of the total energy Esum and the air conditioning energy consumption Eac is larger than the remaining capacity of the battery 40, the HVECU 50 rearranges each drive sections in descending order of the driving load (energy consumption En) (step S160). The HVECU 50 subsequently assigns the CD mode to the rearranged each drive sections in descending order of the driving load until the total energy consumption En of the each assigned drive sections exceeds the remaining capacity of the battery 40, and assigns the CS mode to the remaining drive sections (step S170). Accordingly, the CD mode and the CS mode are assigned to the drive route on condition that the sum of the total energy Esum and the air conditioning energy consumption Eac is larger than the remaining capacity of the battery 40. Then, the HVECU 50 controls the drive mode along the drive support plan of the assigned mode and the effect (control effect) of the drive support control is accumulated (step S190). The control effect may include, for example, a drive distance and a drive time by the motor drive, and a drive distance and a drive time by the hybrid drive during the drive support control. The accumulated control effect is stored in the flash memory (not shown) or the like of the HVECU 50.

When it is determined at step S110 that the read-ahead information is not updated, the HVECU 50 determines whether the drive support control is being performed (step S180). When it is determined at step S180 that the drive support control is not being performed, the HVECU 50 returns the processing flow to step S100, where it is determined whether the drive support control can be performed. When it is determined at step S180 that the drive support control is being performed, the HVECU 50 controls the drive mode along the drive support plan that is created immediately before, and the effect (control effect) of the drive support control is accumulated (step S190).

The HVECU 50 determines whether the deletion condition for deleting the control effect is satisfied (step S200). The deletion condition terminates the drive support control without notifying the control effect, and includes, for example, the condition that the drive support control is terminated by the user operation, the condition that the setting of the route guidance is changed, the condition that the system abnormality is detected, and the condition that the user can recognize the control break. The condition that the drive support control is terminated by the user operation includes not only the condition that the termination of the drive support control is instructed by the user, but also the condition that the charging of the battery 40 is instructed by the user, the condition that the hybrid drive is instructed by the user, the condition that the motor drive is instructed by the user, and the like. The condition that the setting of the route guidance is changed includes the condition that the destination is changed, the condition that the intermediate destination is set, the condition that the intermediate destination is changed, the condition that the route guidance is stopped, and the condition that the destination is deleted. The condition that the system abnormality is detected includes the condition that there is an abnormality in detecting the own vehicle position, the condition that there is an abnormality in obtaining data, the condition that there is an abnormality in the map information database, and the condition that there is an abnormality in communication. The condition that the user can recognize the control break includes the condition that the battery 40 is externally charged, and the condition that the hybrid vehicle crosses a border.

When it is determined at step S200 that the deletion condition is satisfied, the HVECU 50 terminates the drive support control and deletes (erases) the control effect stored in the flash memory or the like (step S250) without notifying the control effect, and terminates this routine.

When it is determined at step S200 that the deletion condition is not satisfied, the HVECU 50 determines whether the condition for terminating or interrupting the drive support control other than the deletion condition is satisfied (step S210). The condition described above include, for example, a condition that the hybrid vehicle reaches the destination, a condition that the temperature of the battery is equal to or lower than the predetermined temperature, a the condition that the state of charge of the battery is equal to or lower than the predetermined ratio, a condition of system stop, a condition of system activation, and a condition that the hybrid vehicle deviates from the drive route. The condition that the hybrid vehicle reaches the destination can be considered as a condition that terminates the drive support control. The condition that the temperature of the battery is equal to or lower than the predetermined temperature, the condition that the state of charge of the battery is equal to or lower than the predetermined ratio, and the condition that the hybrid vehicle deviates from the drive route can be considered as a condition that interrupts the drive support control. The system stop and system activation are performed when taking a break during the route guidance, and can be considered as a condition that temporarily stops the drive support control. When it is determined at step S210 that the condition for terminating or interrupting the drive support control other than the deletion condition is not satisfied, the HVECU 50 returns the processing flow to step S100, where it is determined whether the drive support control can be performed.

When it is determined at step S210 that the condition for terminating or interrupting the drive support control other than the deletion condition is satisfied, the HVECU 50 stops the drive support control while holding the control effect (step S220). Accordingly, the condition for terminating or interrupting the drive support control other than the deletion condition can be considered as a condition for holding the control effect. The HVECU 50 subsequently determines whether the hybrid vehicle reaches the destination (step S230). When it is determined that the hybrid vehicle does not reach the destination, the HVECU 50 returns the processing flow to step S100, where it is determined whether the drive support control can be performed. In this case, the condition regarding the interruption of the drive support control is satisfied. Accordingly, the HVECU 50 determines that the drive support control cannot be performed at step S100 until the condition regarding the interruption is not satisfied. The HVECU 50 waits until the drive support control can be performed.

When it is determined at step S230 that the hybrid vehicle reaches the destination, the HVECU 50 notifies the control effect accumulated and stored in the flash memory or the like (step S240). The control effect can be notified, for example, by displaying "motor drive of ◯◯ km, hybrid drive of ◯◯ km", or the like on the display device 66 incorporated in the installation panel in front of the driver's seat. Then, the HVECU 50 terminates the drive support control, deletes (erases) the control effect stored in the flash memory or the like (step S250), and terminates this routine.

The following describes the read-ahead information generation and transmission process of FIG. 3. The navigation system 80 first determines whether the route guidance is being performed (step S300). Whether the route guidance is being performed is determined based on whether the drive route is set, and the route guidance is being performed in accordance with the input of the destination. When it is determined that the route guidance is not being performed, the navigation system 80 waits until the route guidance is performed.

When it is determined at step S300 that the route guidance is being performed, the navigation system 80 generates the read-ahead information to the destination and increments the counter C for the read-ahead information by a value 1 (step S310). As described above, the read-ahead information includes information on each of drive sections of the drive route, information on driving load in the road traffic information obtained from the traffic information management center 100, and load information necessary for driving each drive section based on the vehicle speed of the own vehicle, the driving power of the own vehicle, and the drive mode of the own vehicle. The counter C is set to a value 0 as an initial value.

Subsequently, the navigation system 80 transmits the read-ahead information and the counter C to the HVECU 50 (step S320), and waits for a predetermined time period to elapse (step S330). The predetermined time period is an interval (for example, 3 minutes or 5 minutes) at which the navigation system 80 communicates with the traffic information management center 100 to obtain the road traffic information or longer time period than that interval. When it is determined that the predetermined time period has elapsed, the navigation system 80 determines whether the terminating condition of the drive support control is satisfied (step S340). When it is determined that the terminating condition of the drive support control is not satisfied, the navigation system 80 returns the processing flow to step S310, where the navigation system 80 generates the read-ahead information and increments the counter C by the value 1. Accordingly, the navigation system 80 repeatedly performs the processing of generating the read-ahead information, incrementing the counter C and transmitting the read-ahead information and the counter C to the HVECU 50 every time the predetermined time period elapses. After the read-ahead information is repeatedly generated and transmitted to the HVECU 50, as described in the drive support control of FIG. 2, the HVECU 50 creates the drive support plan. Accordingly, the HVECU 50 creates the drive support plan every time the predetermined time period elapses. The recreation of the drive support plan described above is considered to be a part of the drive support control and thus can be considered as one of the condition for holding the control effect. When it is determined at step S340 that the terminating condition of the drive support control is satisfied, the navigation system 80 deletes (erases) the read-ahead information or the like (step S350) and terminates this routine.

In the hybrid vehicle 20 of the embodiment described above, the effect (control effect) of performing the drive support control is notified when the hybrid vehicle reaches the destination. When it is determined that the deletion condition for deleting the control effect is satisfied, the HVECU 50 terminates the drive support control and deletes (erases) the control effect stored in the flash memory or the like without notifying the control effect. The deletion condition includes the condition that the drive support control is terminated by the user operation, the condition that the setting of the route guidance is changed, the condition that the system abnormality is detected, and the condition that the user can recognize the control break. The control device can thus hold the control effect when the deletion condition is not satisfied. This enables the user to be more appropriately notified of the control effect. The condition for holding the control effect includes, for example, the condition that the hybrid vehicle reaches the destination that corresponds to the condition that the drive support control is normally terminated. In this case, after the control effect is notified, the drive support control is terminated and the control effect is deleted (erased). The condition for holding the control effect further includes, for example, the condition that interrupts the drive support control, a condition that temporarily stops the drive support control, and the recreation of the drive support plan. Since the drive support control that is interrupted or stopped is restarted by the condition for holding the control effect described above, it is possible to notify the accumulated control effect across the interruption or stop of the drive support control. This enables the user to be more appropriately notified of the control effect by performing the drive support control.

In the hybrid vehicle 20 of the embodiment, the navigation system 80 generates the read-ahead information, and the HVECU 50 creates the drive support plan and performs the drive support control. The navigation system 80 and the HVECU 50 may, however, be configured as a single electronic controller and this single electronic controller may generate read-ahead information and drive support plan and perform drive support control.

In the hybrid vehicle 20 of the embodiment, the navigation system 80 sets the drive route from the current location to the destination using the map information database 84 based on information on the current location and the destination. A modification may, however, set the drive route from the current location to the destination in cooperation with the traffic information management center 100. The navigation system 80 may set the drive route by transmitting the information on the current location and the destination to the traffic information management center 100 and receiving the drive route set based on the information on the current location and the destination from the traffic information management center 100.

In the hybrid vehicle 20 of the embodiment, the navigation system 80 counts up the alive counter Cnb and the HVECU 50 confirms that the alive counter Cnb is counted up by the navigation system 80. This is, however, not restrictive, but such confirmation may not be performed.

In the hybrid vehicle of the present disclosure, the predetermined holding condition may include a condition that the drive support control is interrupted and a condition that the drive support plan is recreated during the drive support control. Further, the predetermined holding condition may include at least a part of a condition that a temperature of the battery is equal to or lower than a predetermined temperature, a condition that a state of charge of the battery is equal to or lower than a predetermined ratio, a condition that the hybrid vehicle reaches the destination, a condition of system stop, a condition of system activation, and a condition that the hybrid vehicle deviates from the drive route. The condition that the hybrid vehicle reaches the destination can be considered as the condition that the drive support control is normally terminated. The condition that the temperature of the battery is equal to or lower than the predetermined temperature, the condition that the state of charge of the battery is equal to or lower than the predetermined ratio, and the condition that the hybrid vehicle deviates from the drive route can be considered as a condition that interrupts the drive support control. The condition of system stop and system activation are performed when the user takes a break during the route guidance, and can be considered as a condition that temporarily stops the drive support control. Since these conditions interrupt or stop the drive support control and restart the drive support control afterwards, it is possible to notify the control effect accumulated regardless of the interruption or stop of the drive support control.

In the hybrid vehicle of the present disclosure, the control device may be programmed to delete the control effect when a predetermined deletion condition is satisfied. In this case, the predetermined deletion condition may include at least a part of a condition that the drive support control is terminated by a user operation, a condition that the setting of the route guidance is changed, a condition that a system abnormality is detected, and a condition that a user can recognize a control break. The condition that the drive support control is terminated by the user operation includes not only a condition that the termination of the drive support control is instructed by the user, but also a condition that the charging of the battery is instructed by the user, a condition that the hybrid drive is instructed by the user, a condition that the motor drive is instructed by the user, and the like. The condition that the setting of the route guidance is changed includes a condition that the destination is changed, a condition that an intermediate destination is set, a condition that the intermediate destination is changed, a condition that the route guidance is stopped, and a condition that the destination is deleted. The condition that the system abnormality is detected includes a condition that there is an abnormality in detecting a vehicle position, a condition that there is an abnormality in obtaining data, a condition that there is an abnormality in a map information database, and a condition that there is a communication abnormality. The condition that the user can recognize the control break includes a condition that the battery is externally charged, a condition that the hybrid vehicle crosses a border. Under these conditions, the drive support control is forcibly terminated without restarting the drive support control. Accordingly, there is no need to hold the control effect.

The following describes the correspondence relationship between the primary elements of the above embodiment and the primary elements of the disclosure described in Summary. In the embodiment, the engine EG corresponds to the "engine", the motor MG corresponds to the "motor", the battery 40 corresponds to the "battery", and the HVECU 50 and the navigation system 80 correspond to the "control device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the hybrid vehicle and so on.

The invention claimed is:

1. A hybrid vehicle, comprising:
an engine;
a motor;
a battery;
map information; and
a control device programmed to:
set a drive route from a current location to a destination,
create a drive support plan that assigns one of drive modes including a CD mode and a CS mode to each of drive sections of the drive route, wherein in the CD mode a motor drive is prioritized to reduce a state of charge (SOC) the battery, and in the CS mode the motor drive and a hybrid drive are combined to maintain the SOC of the battery, and
perform drive support control that causes the hybrid vehicle to be driven according to the drive support plan,
accumulate a control effect that is obtained by performing the drive support control, wherein the control effect is an accumulated distance of the motor drive or an accumulated distance of the hybrid drive during the drive support control,
notify the control effect when the hybrid vehicle reaches the destination by the drive support control, and
hold the control effect even when the drive support control is stopped when a predetermined holding condition is satisfied.

2. The hybrid vehicle according to claim 1,
wherein the predetermined holding condition includes a condition that the drive support control is interrupted and a condition that the drive support plan is recreated during the drive support control.

3. The hybrid vehicle according to claim 2,
wherein the predetermined holding condition is satisfied when at least one of the following conditions is met: a temperature of the battery is equal to or lower than a predetermined temperature, a state of charge of the battery is equal to or lower than a predetermined ratio, the hybrid vehicle reaches the destination, a system stop, a system activation, and the hybrid vehicle deviates from the drive route.

4. The hybrid vehicle according to claim 3,
wherein the control device is programmed to delete the control effect when a predetermined deletion condition is satisfied.

5. The hybrid vehicle according to claim 4,
wherein the predetermined deletion condition is satisfied when at least one of the following conditions is met: the drive support control is terminated by a user operation, the setting of the route guidance is changed, a system abnormality is detected, and a user can recognize a control break.

6. The hybrid vehicle according to claim 2,
wherein the control device is programmed to delete the control effect when a predetermined deletion condition is satisfied.

7. The hybrid vehicle according to claim 6, wherein the predetermined deletion condition is satisfied when at least one of the following conditions is met: the drive support control is terminated by a user operation, the setting of the route guidance is changed, a system abnormality is detected, and a user can recognize a control break.

8. The hybrid vehicle according to claim 1,
wherein the control device is programmed to delete the control effect when a predetermined deletion condition is satisfied.

9. The hybrid vehicle according to claim 8,
wherein the predetermined deletion condition is satisfied when at least one of the following conditions is met: the drive support control is terminated by a user operation, the setting of the route guidance is changed, a system abnormality is detected, and a user can recognize a control break.

* * * * *